US012691647B2

(12) United States Patent
Reed

(10) Patent No.: US 12,691,647 B2
(45) Date of Patent: Jul. 28, 2026

(54) COMPOSITE LOBE JOINT AND MANUFACTURING METHOD

(71) Applicant: Goodrich Corporation, Charlotte, NC (US)

(72) Inventor: Brayton Reed, New York Mills, NY (US)

(73) Assignee: GOODRICH CORPORATION, Charlotte, NC (US)

( * ) Notice: Subject to any disclaimer, the term of this patent is extended or adjusted under 35 U.S.C. 154(b) by 316 days.

(21) Appl. No.: 18/469,656

(22) Filed: Sep. 19, 2023

(65) Prior Publication Data

US 2025/0091301 A1 Mar. 20, 2025

(51) Int. Cl.
*B29C 70/38* (2006.01)
*B29L 31/00* (2006.01)

(52) U.S. Cl.
CPC .......... *B29C 70/384* (2013.01); *B29C 70/388* (2013.01); *B29L 2031/75* (2013.01)

(58) Field of Classification Search
CPC ..... B29C 70/384; B29C 70/388; B29C 65/70; B29C 70/38; B29C 70/72; B29L 2031/75; B29L 2031/324; F16C 3/026; B29D 99/0035
See application file for complete search history.

(56) References Cited

U.S. PATENT DOCUMENTS

| | | | |
|---|---|---|---|
| 4,236,386 A | 12/1980 | Yates et al. | |
| 6,561,912 B1 | 5/2003 | Link | |

| | | | |
|---|---|---|---|
| 7,335,108 B2 | 2/2008 | Lin et al. | |
| 7,419,435 B2 | 9/2008 | Borges et al. | |
| 10,508,682 B2 * | 12/2019 | Larson | F16C 3/026 |
| 11,519,454 B2 | 12/2022 | Baird | |
| 11,795,993 B2 | 10/2023 | Gurvich et al. | |
| 2012/0255669 A1 * | 10/2012 | Catsman | B29C 70/443 |
| | | | 156/189 |

(Continued)

OTHER PUBLICATIONS

Extended European Search Report for EP Application No. 24201484. 3, dated Feb. 7, 2025, pp. 1-8.

(Continued)

*Primary Examiner* — George R Koch
*Assistant Examiner* — Christopher C Caillouet
(74) *Attorney, Agent, or Firm* — CANTOR COLBURN LLP

(57) ABSTRACT

Methods of making composite drive shafts and manufacturing assemblies thereof are provided. The methods include providing a removable mandrel having a cylindrical shape and assembling a lobe joint member at an end thereof. The lobe joint member includes at least three lobes equally distributed thereabout. A removable end flange is assembled to the lobe joint member at an opposite end of the lobe joint member from the removable mandrel to form a manufacturing assembly. A composite material is applied to an exterior surface of the manufacturing assembly to form a composite tubular that includes the lobe joint member at an end thereof. The removable end flange is removed from the lobe joint member and the removable mandrel is removed from within the composite tubular to form a composite drive shaft comprising the composite tubular and the lobe joint member integrally formed at an end of the composite tubular.

18 Claims, 8 Drawing Sheets

(56)             References Cited

U.S. PATENT DOCUMENTS

| | | |
|---|---|---|
| 2021/0039336 A1 | 2/2021 | Zhao et al. |
| 2022/0143933 A1 | 5/2022 | Iyer et al. |
| 2022/0154762 A1 | 5/2022 | Pfaller et al. |
| 2024/0101265 A1 | 3/2024 | Gurvich et al. |
| 2024/0110592 A1 | 4/2024 | Gurvich et al. |

OTHER PUBLICATIONS

Stoffel Polygon Systems "What is a Polygon Profile?", pp. 1-4, retrieved Jul. 26, 2023, retrieved from https://www.stoffelpolygonsystems.com/what-is-a-polygon/.

* cited by examiner

202

206

200

206

204

200

210

202

206

208

206

204

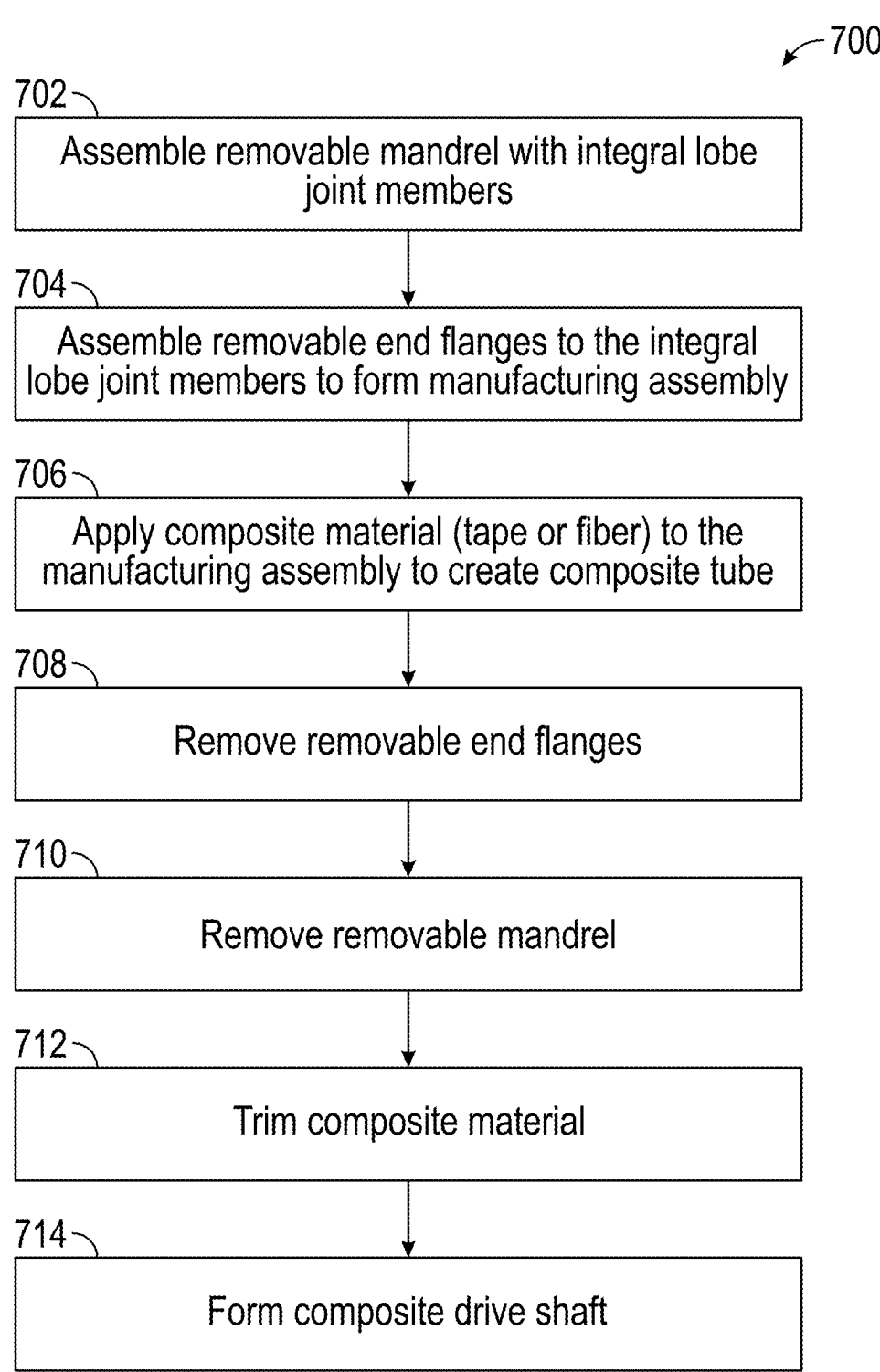

702 — Assemble removable mandrel with integral lobe joint members

704 — Assemble removable end flanges to the integral lobe joint members to form manufacturing assembly 706 — Apply composite material (tape or fiber) to the manufacturing assembly to create composite tube 708 — Remove removable end flanges 710 — Remove removable mandrel 712 — Trim composite material 714 — Form composite drive shaft

FIG. 7

COMPOSITE LOBE JOINT AND MANUFACTURING METHOD

BACKGROUND

Embodiments of the present disclosure are related to the art of composite shafts for aircraft and, more particularly, to composite shafts and methods of making composite shafts for aircraft having composite lobe joints.

Composite materials exhibit significant weight efficiency with respect to strength and stiffness properties in comparison with more conventional metals and alloys. Thus, composite materials are extremely attractive for numerous aircraft structures, including drive shafts. Drive shafts usually represent straight structural elements with a cylindrical hollow shape having constant or variable circular cross-section. Composite shafts are typically formed by polymer-matrix fiber-reinforced materials fabricated about a mandrel. The polymer and fiber material combine to form a wall thickness of the shaft that drives one or more strength and stiffness properties needed to satisfy design criteria such as structural integrity. The thicker the wall, the more resistant the shaft is to applied loads. However, additional wall thickness also contributes to increased weight and cost. Therefore, there is a need to design and fabricate composite drive shafts with relatively thin walls and correspondingly lower weight, but at the same time, reliable enough to sustain service conditions.

Drive shafts can be designed and manufactured with one or more components. If dissimilar materials are used, the components require a joint to create an assembly. This joint is configured transfer the input loads (e.g., torque, bend moment, axial force) from one component to another. Historically, with metallic drive shafts, dissimilar metals would be joined using fasteners oriented through the thickness of the overlapping features. This same method can also be used when one of the dissimilar metals is replaced with a composite material (i.e., a composite-metal interface/joint). Such a method requires drilling through both components to create a match drilled hole, and then assembling a fastener through the hole to affix the two components together. Using fasteners (e.g., metallic fasteners) will add weight and may result in a time intensive process for assembly, particularly as the number of fastener holes is increased. Accordingly, improved drives shafts and methods of manufacturing such drives shafts can address these and other issues while providing benefits in, at least, cost, manufacturing time and complexity, and/or weight.

BRIEF DESCRIPTION

According to some embodiments, methods of making composite drive shafts are provided. The methods include providing a removable mandrel having a cylindrical shape, assembling a lobe joint member at an end of the removable mandrel, the lobe joint member comprising at least three lobes equally distributed about the lobe joint member, assembling a removable end flange to the lobe joint member at an opposite end of the lobe joint member from the removable mandrel to form a manufacturing assembly, applying a composite material to an exterior surface of the manufacturing assembly to form a composite tubular that includes the lobe joint member at an end thereof, removing the removable end flange from the lobe joint member, and removing the removable mandrel from within the composite tubular to form a composite drive shaft comprising the composite tubular and the lobe joint member integrally formed at an end of the composite tubular.

In addition to one or more of the features described above, or as an alternative, further embodiments of the methods may include that the lobe joint member is a first lobe joint member arranged at a first end of the removable mandrel and the removable end flange is a first removable end flange. The method further includes assembling a second lobe joint member at an end of the removable mandrel opposite the first lobe joint member and assembling a second removable end flange to the second lobe joint member at an opposite end of the second lobe joint member from the removable mandrel.

In addition to one or more of the features described above, or as an alternative, further embodiments of the methods may include that the composite material comprises composite fibers and applying the composite fibers comprises automated fiber placement.

In addition to one or more of the features described above, or as an alternative, further embodiments of the methods may include that the composite material comprises composite tape and applying the composite tape comprises automated tape laying.

In addition to one or more of the features described above, or as an alternative, further embodiments of the methods may include that removing the removable mandrel comprises a metal material.

In addition to one or more of the features described above, or as an alternative, further embodiments of the methods may include that the lobe joint member comprises an inwardly extending mounting flange.

In addition to one or more of the features described above, or as an alternative, further embodiments of the methods may include that the removable end flange is attached to the lobe joint member by one or more fasteners to the mounting flange.

In addition to one or more of the features described above, or as an alternative, further embodiments of the methods may include that the removable end flange is attached to the lobe joint member by one or more fasteners.

In addition to one or more of the features described above, or as an alternative, further embodiments of the methods may include that the lobe joint member has an axis passing therethrough, the lobe joint member comprising a first sleeve at a first end of the lobe joint member in the axial direction, a first tapering portion of increasing material thickness extending from the first sleeve to the at least three lobes, a second tapering portion of decreasing material thickness extending from the at least three lobes toward a second sleeve at a second end of the lobe joint member, opposite the first sleeve.

In addition to one or more of the features described above, or as an alternative, further embodiments of the methods may include trimming excess material of the composite material that was applied to the removable end flange during the application of the composite material to the manufacturing assembly.

In addition to one or more of the features described above, or as an alternative, further embodiments of the methods may include that applying the composite material comprises applying at least one of composite fibers and composite tapes about the manufacturing assembly.

In addition to one or more of the features described above, or as an alternative, further embodiments of the methods may include that multiple layers of the at least one of composite fibers and composite tapes are applied to the manufacturing assembly.

In addition to one or more of the features described above, or as an alternative, further embodiments of the methods may include that each layer of the multiple layers is arranged at a different angle relative to an axis through the manufacturing assembly.

In addition to one or more of the features described above, or as an alternative, further embodiments of the methods may include that assembling the lobe joint member at the end of the removable mandrel comprises securing the lobe joint member to the removable mandrel at a pilot feature of the removable mandrel.

According to some embodiments, manufacturing assemblies to form composite shafts are provided. The manufacturing assemblies include a removable mandrel having a cylindrical shape with a first end and a second end, a lobe joint member attached to the first end of the removable mandrel, and a removable end flange attached to the lobe joint member opposite the removable mandrel. The lobe joint member includes a first sleeve defining a cylindrical portion, a first tapering portion extending axially along the lobe joint member and increasing in material thickness as compared to the first sleeve, a set of lobes and flanks axially adjacent the first tapering portion, opposite the first sleeve, wherein each lobe of the set of lobes is defined by a material thickness greater than a material thickness of the flanks, wherein the first tapering portion smoothly transitions to each of the lobes and flanks, a second tapering portion extending axially along the long joint member from the set of lobes and flanks, a second sleeve arranged adjacent the second tapering portion such that a smooth transition of decreasing material thickness extends from the set of lobes and flanks to the second sleeve. The lobe joint member has a uniform interior diameter surface along an axial length thereof.

In addition to one or more of the features described above, or as an alternative, further embodiments of the manufacturing assemblies may include that the lobe joint member is a first lobe joint member arranged at the first end of the removable mandrel and the removable end flange is a first removable end flange, the manufacturing assembly further includes a second lobe joint member attached at the second end of the removable mandrel opposite the first lobe joint member and a second removable end flange attached to the second lobe joint member at an opposite end of the second lobe joint member from the removable mandrel.

In addition to one or more of the features described above, or as an alternative, further embodiments of the manufacturing assemblies may include that the lobe joint member comprises an inwardly extending mounting flange configured to at the removable end flange.

In addition to one or more of the features described above, or as an alternative, further embodiments of the manufacturing assemblies may include that the removable mandrel comprises a pilot feature for locating the lobe joint member on the removable mandrel.

In addition to one or more of the features described above, or as an alternative, further embodiments of the manufacturing assemblies may include that the lobe joint member comprises at least three lobes equally spaced about a circumference of the lobe joint member.

In addition to one or more of the features described above, or as an alternative, further embodiments of the manufacturing assemblies may include that the lobe joint member is formed from a metallic material.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 7 is a flow process of a manufacturing method for manufacturing a composite drive shaft in accordance with an embodiment of the present disclosure.

DETAILED DESCRIPTION

A detailed description of one or more non-limiting examples of the disclosed apparatus and method are presented herein by way of exemplification and not limitation with reference to the Figures.

Figure 1:
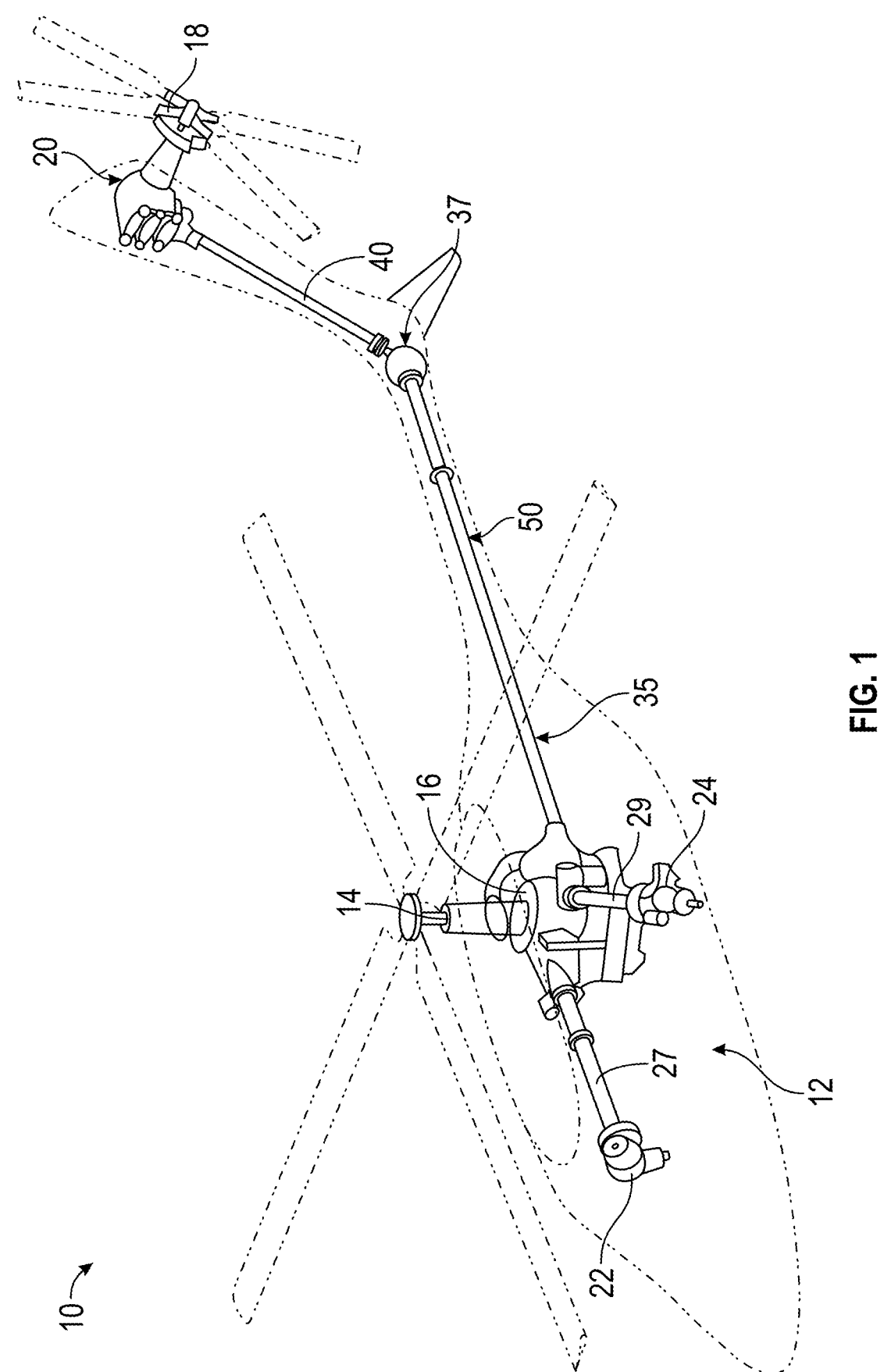
FIG. 1 depicts a schematic illustration of a rotary wing aircraft that may incorporate drive shafts manufactured in accordance with embodiments of the present disclosure.

Referring to FIG. 1, a rotary wing aircraft 10 that may incorporate drive shafts as disclosed herein is illustratively shown. The rotary wing aircraft 10 includes a fuselage 12 that supports a main rotor assembly 14. The main rotor assembly 14 includes a main rotor gear box 16 and a tail rotor 18 having a tail rotor gear box 20 associated therewith. The rotary wing aircraft 10, as illustrated, includes a first engine 22 and a second engine 24. A first drive shaft system 27 extends between the first engine 22 and the main rotor gear box 16. A second drive shaft system 29 extends between the second engine 24 and the main rotor gear box 16. A tail rotor drive shaft system 35, which may be made up from multiple tail rotor drive shaft sections 50 (not separately labeled), extends between the main rotor gear box 16 and an intermediate gear box 37. A pylon drive shaft system 40 extends between the intermediate gear box 37 and the tail rotor gear box 20.

The tail rotor drive shaft system 35, the pylon drive shaft system 40, the first drive shaft system 27, and/or the second drive shaft system 29 may each include one or more drive shafts and/or coupled drive shaft sections. Each drive shaft or drive shaft section (collectively referred to as "drive shaft") may be formed from a variety of materials. Conventionally, such drive shafts were manufactured using metallic materials. However, the use of composite materials has been made to reduce the weight and/or costs and to provide other benefits over fully metal drive shaft configurations. For example, drive shafts can be designed and manufactured with one or more components (e.g., drive shaft sections, joints, coupling mechanisms, fasteners, etc.). If dissimilar materials are used, the components require a joint to create an assembly. The joint between two components of a drive shaft assembly is configured to transfer an input load (e.g., torque, bend moment, axial force, etc.) from one component to another. Historically with metallic drive shafts of dissimilar metals would be joined together, the use of fastener was required to join the sections at a joint. The fasteners are typically oriented through the thickness of overlapping features of the two components or sections to be joined together. This same method (use of fasteners with overlapping sections) can be used when one of the dissimilar materials is a composite material (as compared to a metal material). Whether joining two metallic components or a metallic component and a composite component, the process requires drilling through both components to create matching drilled holes. Fasteners are then inserted into the matched holes and used to fixedly join the two components together. Typically, the fasteners are formed from metal materials, to ensure that the desired force transfers from one component to another are efficient (e.g., torque, bend moment, axial force, etc.) and the joint does not fail. Such metallic fasteners add weight and the assembly process can be time intensive, particularly if a large number of holes and fasteners are required.

However, the use of composite materials presents additional manufacturing processes that permit different ways or mechanisms to join two components together. That is, for example, through the use of composite materials of at least one component, the use of fasteners may be eliminated. By eliminating fasteners and associated manufacturing processes (e.g., hole drilling), drive shafts and methods of manufacture may be improved, as there can be weight savings and labor cost savings. In accordance with some embodiments of the present disclosure, joints for composite tubes joining to metallic flanges are described. The disclosed joints do not include fasteners and use alternative mechanisms to ensure a complete connection and the desired force transfers between the joined components. For example, in accordance with some embodiments of the present disclosure, the disclosed drive shafts and joints thereof may be capable of transmitting torque and axial force. The mechanism of the joint and joining of the components may be integral with the composite section (e.g., a composite tube). Methods of manufacturing such drive shafts, with composite and metallic components, are also disclosed herein.

Figure 2A:
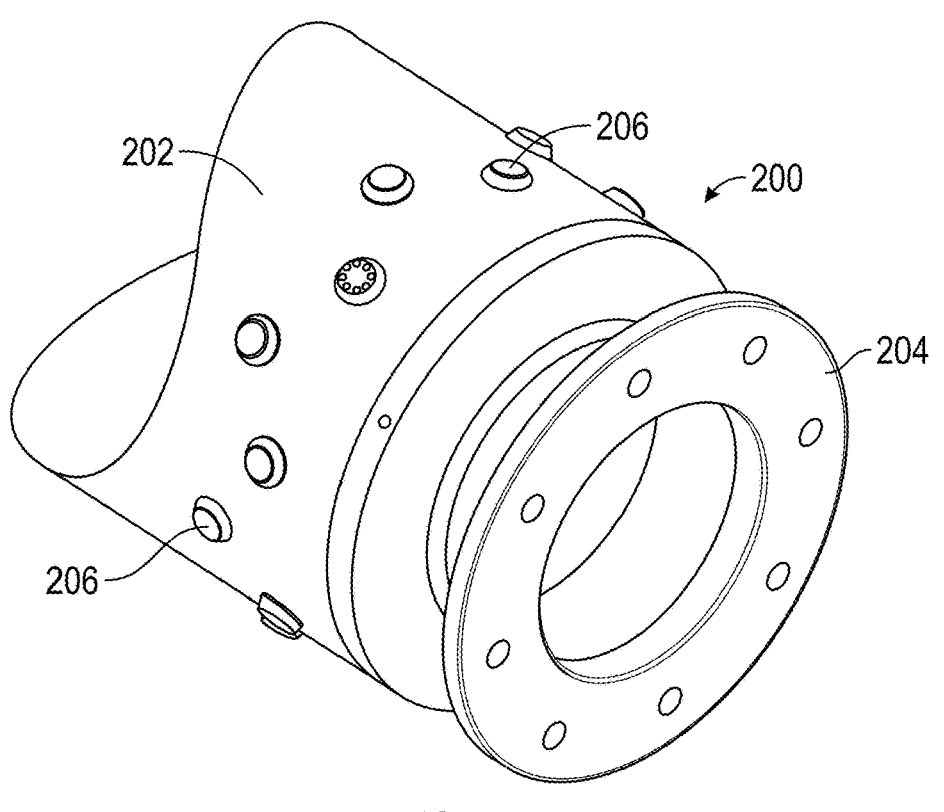
FIG. 2A is a schematic illustration of part of a conventional drive shaft.
Figure 2B:
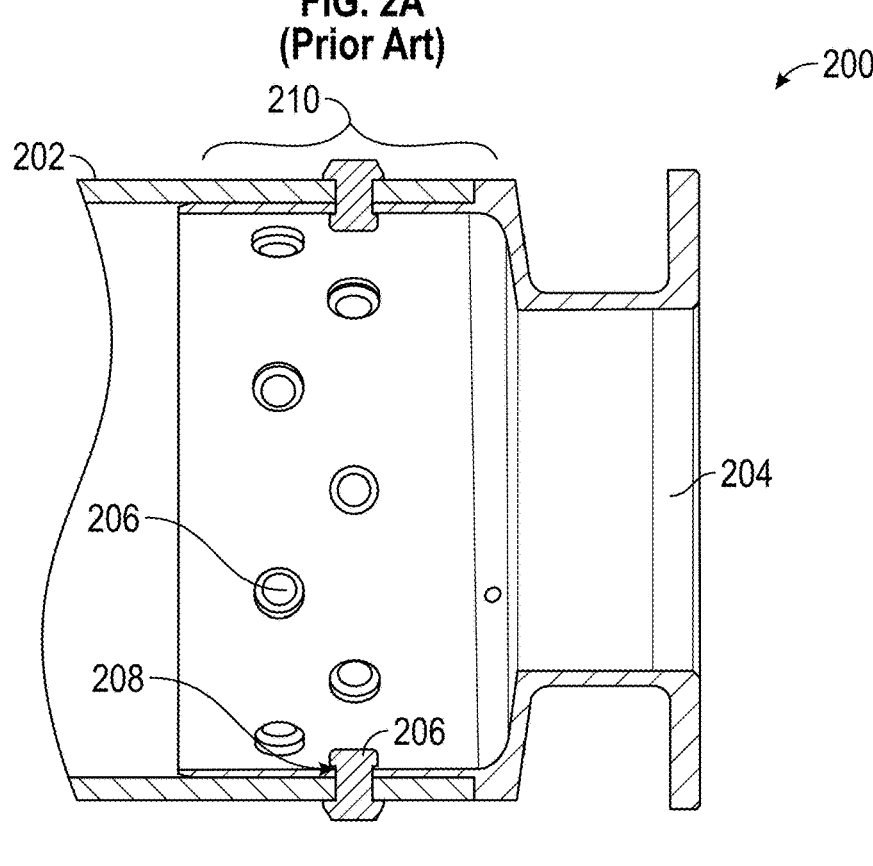
FIG. 2B is a cross-sectional illustration of the drive shaft of FIG. 2A.

Referring now to FIGS. 2A-2B, a conventional joint assembly 200 is illustratively shown. The joint assembly 200 includes a first component 202 and a second component 204 that are fixedly attached to each other. The first component 202 may be formed a first material and the second component may be formed of a second material that is different from the first material. In some configurations of conventional joint assemblies, the first and second materials may both be metals (which may be different). In other configurations, the first material may be a composite material and the second material may be a metallic material. The joint assembly 200 may be for use on an aircraft and may be used to form a drive shaft or a portion of a drive shaft. As illustrated, the first component 202 is a shaft and the second component 204 is a flange for connecting to another component of a drive system or the like.

As shown, the first and second components 202, 204 may be joined together by one or more fasteners 206. The fasteners 206 are passed through aligned fastener holes 208 in a region of overlap 210 between the first and second components 202, 204. In this configuration, the second component 204 is inserted into the first component 202, and the fastener holes 208 may be drilled or otherwise formed through the material in the region of overlap 210, and then the fasteners 206 may be inserted through the formed fastener holes 208 to join the two components 202, 204 together.

As discussed above, embodiments of the present disclosure are directed to joints or joining mechanisms between different components of drive shafts. The disclosed joining mechanisms eliminate the need for fasteners to be used to join components of different compositions. For example, in accordance with some embodiments of the present disclosure are directed to a shaft configuration having a sleeve, a set of radially patterned lobes, and a flange, all integrated into a single structure. In such a shaft configuration, resistance to torque may be provided through a geometry provided by the lobes that are integrally formed with the shaft proximate a connection with an additional component (e.g., another shaft or other drive component). Resistance to the bend moment and axial force may be provided by a taper leading up to the lobe shape. Additionally, in some embodiments, the composite tube may be manufactured using an Automated Fiber Placement (AFP) method and/or an Automated Tape Laying (ATL) method. Such manufacturing methods allow for continuous unidirectional fibers to efficiently transfer torque through the lobes of the structure, as described herein.

Figure 3:
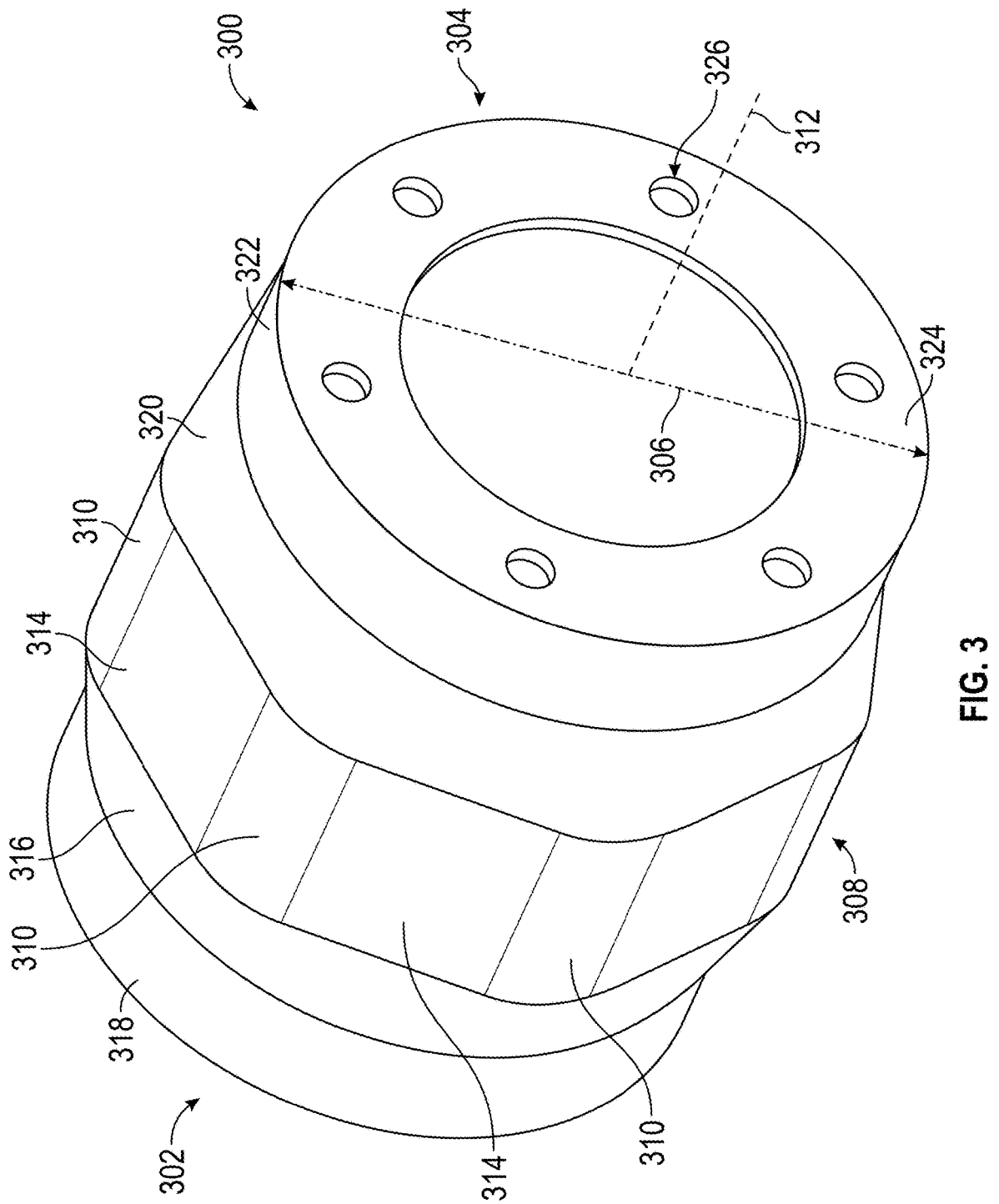
FIG. 3 is a schematic illustration of a lobe joint member in accordance with an embodiment of the present disclosure.

Referring now to FIG. 3, a schematic illustration of a lobe joint member 300 in accordance with an embodiment of the present disclosure is shown. The lobe joint member 300 is configured to replace the second component 204 shown in FIG. 2. That is, the lobe joint member 300 is configured to provide a flange connection at the end of a shaft or tube or the like. The lobe joint member 300 is a solid body structure, which may be formed from metal or composite material. However, the lobe shape and geometry thereof may be customized more readily through the use of composite materials. In some non-limiting embodiments, the lobe joint member 300 may be made from metallic and/or composite materials. For example, and without limitation, the lobe joint members of the present disclosure may be manufactured or formed from titanium, steel, aluminum, alloys thereof, and the like. In other configurations, the lobe joint members of the present disclosure may be manufactured or formed from thermosets and/or thermoplastics using, for example, injection molding. The materials, whether metallic or composite, may be manufactured using additive manufacturing techniques.

The lobe joint member 300 includes a first end 302 and a second end 304. The first end 302 of the lobe joint member 300 is configured to interface with a removable mandrel during a manufacturing process, as described below, and the second end 304 is configured to enable connection to other drive shaft components (e.g., similar to element 204 of FIGS. 2A-2B). The lobe joint member 300 is configured to be integrated into a drive shaft tube, rather than being fixedly attached to a tube as shown in FIGS. 2A-2B. The first end 302 and the second end 304 each define an outer diameter 306 and the lobe joint member 300 generally defines a cylindrical or tubular structure that extends between the first end 302 and the second end 304.

Arranged between the first end 302 and the second end 304, the lobe joint member 300 includes a lobed portion 308. The lobed portion 308 includes two or more lobes 310 that are provided with a material thickness that is greater than the extent of the outer diameter 306 of the lobe joint member 300. That is, the lobed portion 308 provides for an increased dimension (in the radial direction) relative to an axis 312 through the lobe joint member 300. The lobes 310 of the lobed portion 308 extend in an axial direction at distinct locations about a circumference of the lobe joint member 300. Between the lobes 310 of the lobed portion 308 in the tangential or circumferential direction (i.e., between adjacent lobes 310) are flanks 314. The flanks 314 may be substantially flat or may have a lesser curvature than the lobes 310. As a result, the lobed portion 308 is formed of a set of alternating lobes 310 and flanks 314 about the circumference of the lobe joint member 300. The lobes 310 and the flanks 314 may have the same axial length.

In the axial direction, the lobed portion 308 is configured to taper both in a direction toward the first end 302 and toward the second end 304. As shown, a first tapered portion 316 extends in an axial direction from the lobed portion 308 to a first end sleeve 318. Similarly, a second tapered portion 320 extends in an axial direction from the lobed portion 308 to a second end sleeve 322. The tapered portions 316, 320 taper (or reduce in outer diameter) from the edges of the lobed portion 308, at both the lobes 310 and the flanks 314 such that a substantially continuous and smooth taper extends from the lobed portion 308 in the direction of each the first end 302 and the second end 304.

The first end sleeve 318 and the second end sleeve 322 may be cylindrical in shape and may have an outer diameter surface equal to the outer diameter 306 of the lobe joint member 300. As such, the lobed portion 308 is defined by an increased material thickness relative to the sleeves 312, 316 and extend radially outward to define the lobes 310 and flanks 314 of the lobed portion 308. The first end sleeve 318 may be configured to engage with a temporary or removable mandrel or the like, for the purpose of integrally forming a shaft that employs the lobe joint member 300 at an end thereof. The second end sleeve 322 may define, in part, a coupling portion 324 that is configured for selective engagement with another component (e.g., another shaft portion and/or part of a drive system). The coupling portion 324 may include one or more attachment elements 326, such as apertures or holes (e.g., negative features), although such attachment elements 326 may be configured as positive features, such as bumps, protrusions, threaded studs, or the like.

The sleeves 318, 322 are features that provide a constant or uniform diameter transition from the lobed portion 308 to a uniform cross-section of a composite tube to which the lobe joint member 300 may be integrated into. This configuration, having the sleeves 318, 322 can support a manufacturing process where tapes or the like are wrapped or wound about a removable mandrel, and the removable mandrel may be removed to leave a composite tube having the lobe joint member 300 at one or both ends thereof. At the second end 304, the lobe joint member 300 includes the coupling portion 324 that is arranged as an inverse flange design (e.g., extends radially inward). The coupling portion 324 is projected radially inward and includes the attachment elements 326 (e.g., bolt holes) used for connecting to an interface or mating component when assembled into a final system or assembly (e.g., to another drive shaft section and/or to a motor/engine, or the like). As described herein, the holes attachment elements 326 may also be used during a manufacturing process for forming a drive shaft with the integrated lobe joint member 300. The length (e.g., axial) and/or material thickness of the sleeves 318, 322, the tapering portions 316, 320, and/or the lobes/flanks 310/314 may be set based on application requirements, such as available envelope and/or load requirements (e.g., torque, etc.), material requirements and/or limitations, or based on other considerations as will be appreciated by those of skill in the art.

Figure 4A:
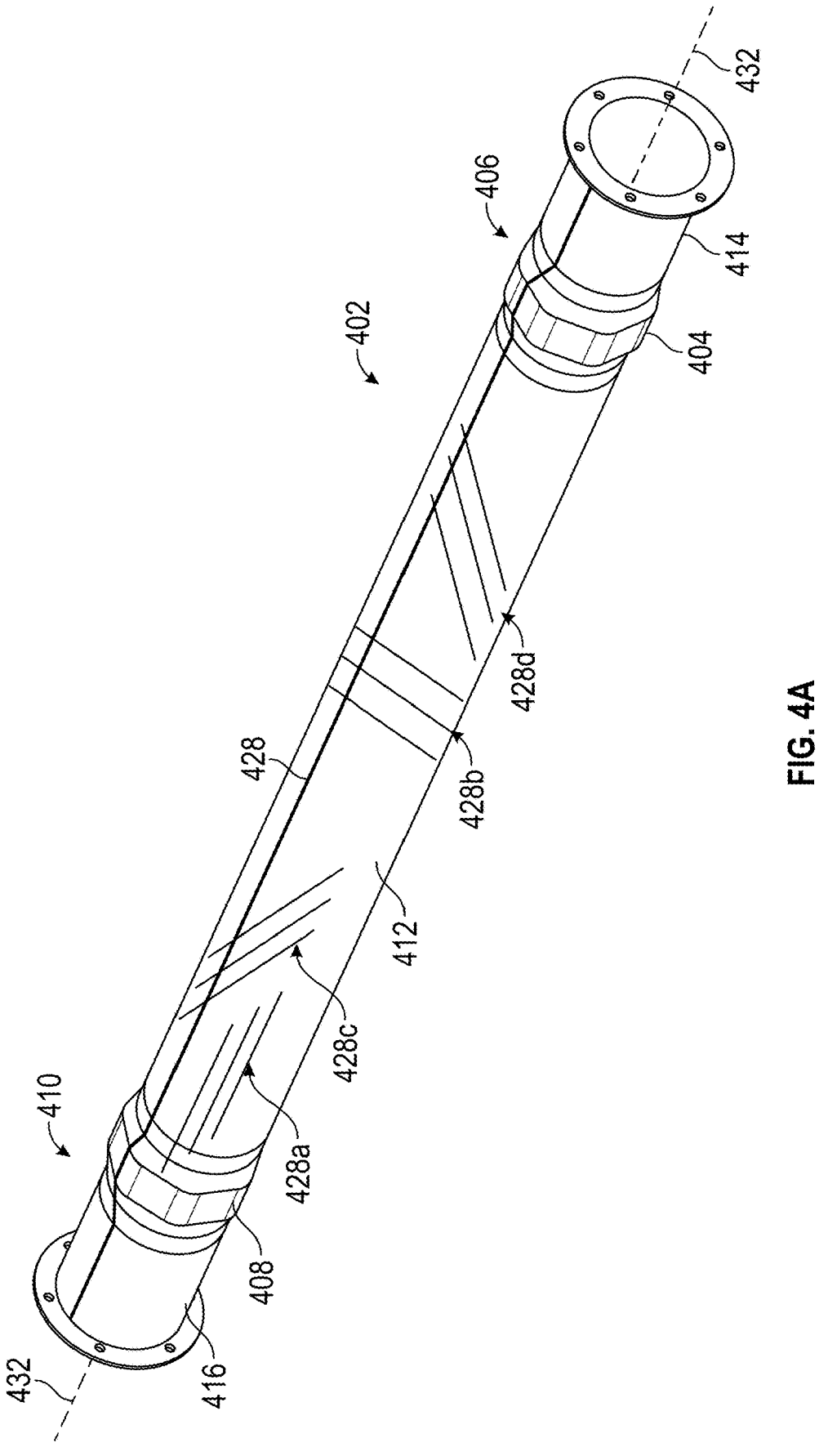
FIG. 4A is a schematic illustration of a manufacturing assembly in accordance with an embodiment of the present disclosure.
Figure 4B:
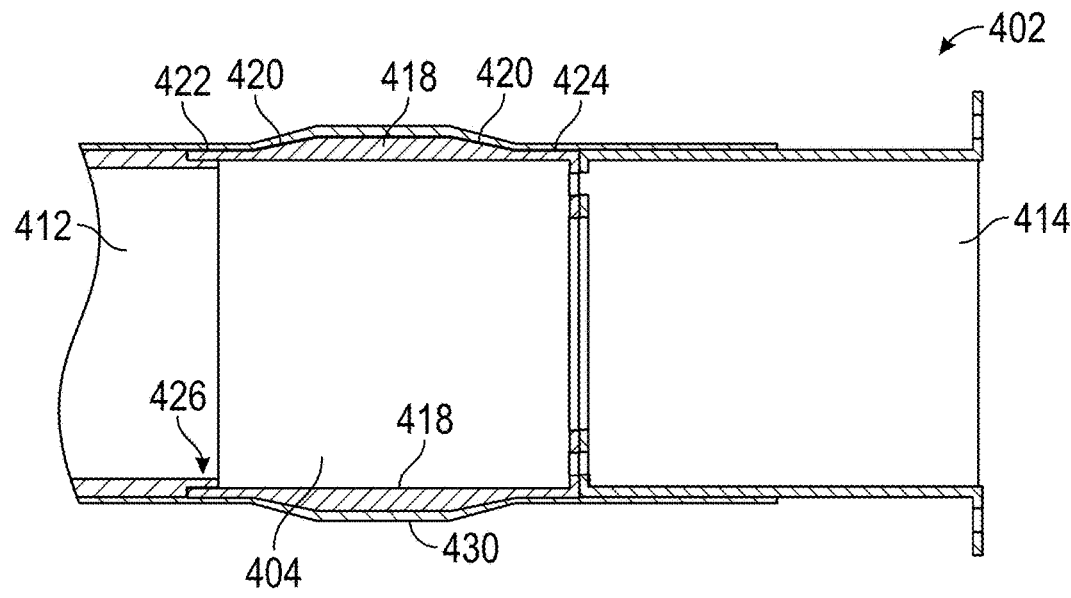
FIG. 4B is a cross-sectional view of a portion of the manufacturing assembly of FIG. 4A.
Figure 4C:
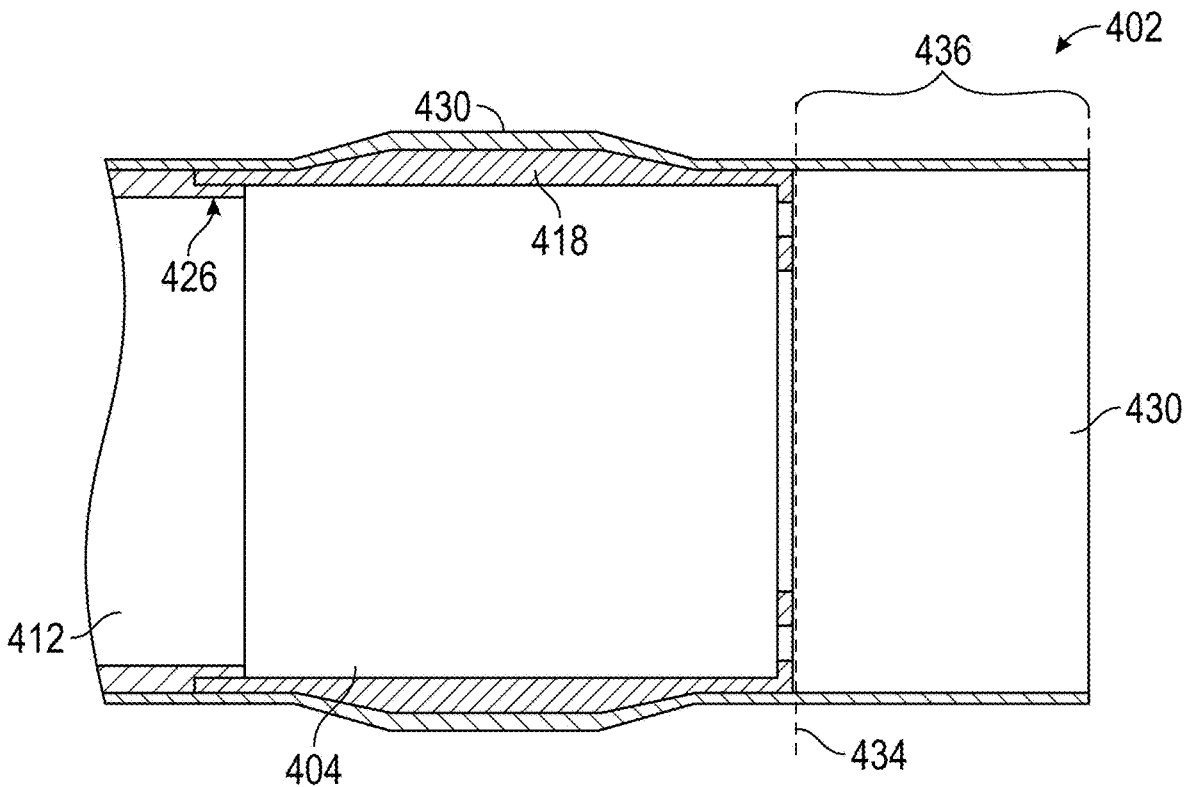
FIG. 4C is a cross-sectional view of a portion of the manufacturing assembly of FIG. 4A during a manufacturing process.
Figure 4D:
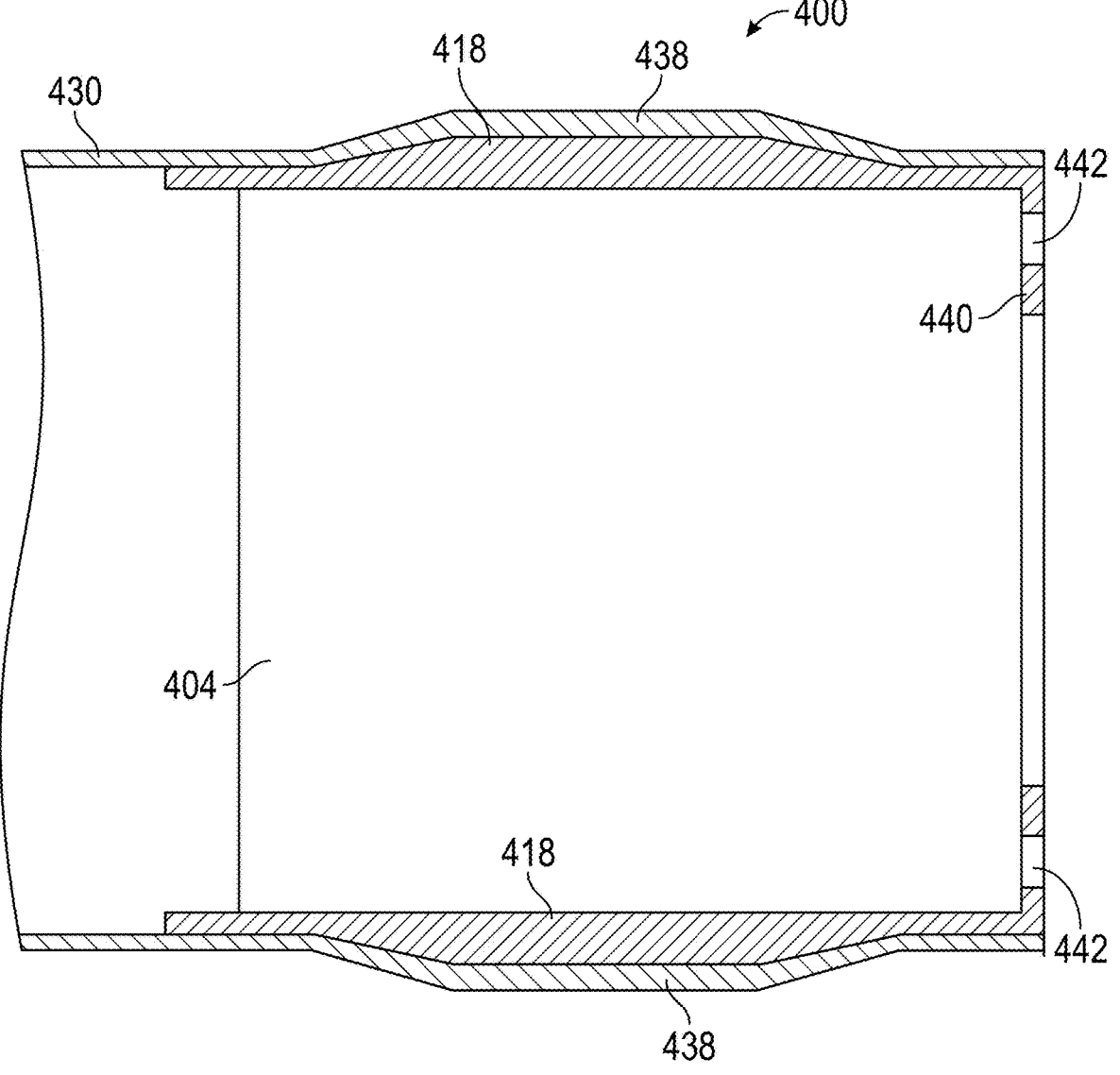
FIG. 4D is a cross-sectional view of a portion of a composite drive shaft manufactured using the manufacturing assembly of FIG. 4A.

Referring now to FIGS. 4A-4D, schematic illustrations of a manufacturing process of a composite drive shaft 400 (shown in FIG. 4D) are shown. FIG. 4A illustrates a manufacturing assembly 402 for manufacturing the composite drive shaft 400 and FIGS. 4B-4C illustrate various steps of the manufacturing process of the composite drive shaft 400. As shown, the manufacturing assembly 402 includes a first lobe joint member 404 at a first end 406 and a second lobe joint member 408 at a second end 410 of the manufacturing assembly 402. FIGS. 4B-4D illustrate enlarged detail of features of the first end 406 and associated first lobe joint member 404. It will be appreciated that, in the illustrated configuration of FIGS. 4A-4D, the second end 410 may be substantially similar and thus details thereof are omitted for sake of brevity and clarity.

The manufacturing assembly 402, shown in FIG. 4A, includes a removable mandrel 412 with the first lobe joint member 404 arranged at the first end 406 thereof and the second lobe joint member 408 arranged at the second end 410 thereof. On opposite sides of each of the first and second lobe joint member 404, 408, relative to the removable mandrel 412 are removable end flanges 414, 416, respectively.

As shown in FIG. 4B, the first lobe joint member 404 includes two or more lobes 418. As noted, the second lobe joint member 408 may be configured similarly at the opposite end of the removable mandrel 412. The first lobe joint 404 has tapered portion 420 that taper in an axial direction to respective sleeves 422, 424. The sleeves 422, 424 may be similar to that described above, with a first sleeve 422 extending toward the removable mandrel 412 and the second sleeve 424 extending toward the removable end flange 414. As shown in FIGS. 4B-4C, the first sleeve 422 and the removable mandrel 412 have the same outer diameter, such that a smooth or continuous surface extends along an exterior surface of the removable mandrel 412 and the first sleeve 422. Similarly, on the opposite side of the lobes 418, the tapered portion 420 tapers radially inward to the second sleeve 424, with the second sleeve 424 having the same outer diameter as the removable end flange 414, such that a smooth or continuous surface extends along an exterior surface of the second sleeve 424 and an exterior surface of the removable end flange 414.

As shown in FIGS. 4B-4C, the removable mandrel 412 may be arranged to interferingly fit (interference fit) with the first sleeve 422, with the material of the removable mandrel 412 being arranged radially inward from the first sleeve 422. In some configurations, the removable mandrel 412 may include a pilot feature 426 for locating the removable mandrel 412 relative to the first lobe joint member 404.

As shown in FIG. 4A, with the manufacturing assembly 402 assembled, the composite drive shaft 400 may be manufactured. For example, the removable mandrel 412, the first lobe joint member 404, the second lobe joint member 408, and the removable end flanges 414, 416 may be arranged to form the manufacturing assembly 402 which may serve as a support structure, base, scaffold, or the like for making a composite tubular drive shaft. As illustratively shown in FIG. 4A, composite tape 428 may be applied to the manufacturing assembly 402 to form a composite tube 430. The composite tape 428 may be applied in one or more layers and maybe be oriented in one or more directions relative to an axis 432 through the manufacturing assembly 402. The composite tape 428 may be applied in a variety of orientations. For example, as illustrated, orientations 428*a*-*d* are depicted, with a first orientation 428*a* being parallel to the axis 432, the second orientation 428*b* being circumferential or tangentially about the manufacturing assembly 402, the third orientation 428*c* and the fourth orientation 428*d* being angled relative to the axis 432, and thus may define helical windings about the manufacturing assembly 402. The angled windings may be any angle from 0° to 180° relative to the axis 432, with a continuous laying of the tape/fibers. Multiple layers or wrappings may be employed, and in some such embodiments, the different layers may be wrapped at different relative angles. The wrapped composite tape 428 will form and define the composite tube 430.

The application of the composite tape 428 (or the layers thereof), may be by various known mechanisms. For example, in some non-limiting embodiments, the composite tape may be applied by Automated Fiber Placement (AFP) and/or Automated Tape Laying (ATL) processes. In the case of AFP, the composite material (e.g., pre-impregnated) may be applied in the form of composite fibers that are applied to and/or wound about the manufacturing assembly 402. These manufacturing techniques allow for the use of continuous, unidirectional fiber to efficiently transfer torque through the lobes while providing structural rigidity along the length of the formed composite drive shaft 400. As shown in FIG. 4A, during the manufacturing process, the composite tape 428 will be applied to overlap each of the removable mandrel 412, the first lobe joint member 404, the second lobe joint member 408, and the removable end flanges 414, 416. As a result, as shown in FIG. 4B, the composite tape 420 will be applied over the removable mandrel 412, the first lobe joint member 404, and the removable end flange 414 on the end of the first lobe joint member 404.

At the next step, shown in FIG. 4C, the removable end flange 414 may be removed. With the removable end flange 414 removed, the composite tube 430 will include some amount of material that extends beyond an end 434 of the first lobe joint member 404. This material extension 436 of the composite tube 430 may be removed such that the composite tube 430 and the first lobe joint member 404 terminate or end at the same position, as shown in FIG. 4D. In addition to removal of the removable end flange 414 (and the second removable end flange 416), the removable mandrel 412 may also be removed, as shown in FIG. 4D. The removing of the removable mandrel 412 may be by known mechanisms including, without limitation, the use of reusable temperature formable mandrels, meltable or dissolvable metal mandrels (e.g., temperature and/or chemical processing), compressed ceramic/sand and/or chemical washout mandrels, and/or multipiece mandrels.

With the removable end flanges 414, 416 and the removable mandrel 412 removed, the final composite drive shaft 400 may be formed, with an end portion shown in FIG. 4D. As shown, the composite tape 430 will overlap and enclose the first lobe joint member 404 at this illustrated end, with the second lobe joint member 408 being similarly wrapped and enclosed. As a result, the composite drive shaft 400 is formed of a tubular section formed from the composite tape

430, and a lobe joint member 404, 408 integrally contained within the composite tape 430. As shown in FIG. 4D, the composite tape 430 will bulge 438 at the location of the lobes 418 of the lobe joint member 404.

In the formed composite drive shaft 400, resistance to torque is provided by geometry of the lobes 418 and resistance to the bend moment and axial force is provided by the tapered portions 420 and sleeves 422, 424 on opposite sides (axially) of the lobes 418. With the lobe joint members 404, 408 integrated into the end of the composite drive shaft 400, the lobe joint members 404, 408 may be configured to provide an attachment mechanism for another components (e.g., another drive shaft, an engine/motor, a joint, a transmission element, or the like). For example, as shown in FIG. 4D, the first lobe joint member 404 includes a radially inward extending mounting flange 440 that may include one or more mounting apertures 442. The mounting flange 440 and the one or more mounting apertures 442 provide a mounting or engagement end of the composite drive shaft 400 such that other components may be attached to the composite drive shaft 400. The mounting apertures 442 may also be used during the manufacturing process to secure the removable end flanges 414, 416 to the respective lobe joint members 404, 408.

The composite drive shaft 400 may provide an alternative joint for composite tubes to join or connect with metallic flanges, that does not include fasteners, and is capable of transmitting torque and axial force. The joint (e.g., lobe joint members 404, 408) may be integrally formed with composite drive shaft 400 without the need for fasteners or the like. In accordance with some embodiments, the composite drive shafts include one or more lobe joint members that include axially extending sleeves (422, 424), radially patterned lobes (418) arranged between the sleeves with tapering surfaces (420) from the sleeves to the lobes, and a mounting flange (440). As discussed above, resistance to torque is provided by the geometry of the lobes and resistance to the bend moment and axial force is provided by the taper leading up to the lobe shape. The selected manufacturing method(s) related to tape and/or fiber laying (e.g., AFP/ATL) allows for continuous unidirectional fibers to efficiently transfer torque through the lobes. The sleeve structure on sides/end about the lobes provide a constant transition from the lobe feature to the uniform cross-section of the composite drive shaft. Such configuration also may permit the use of and manufacturing on a removable mandrel (e.g., 412).

In accordance with embodiments of the present disclosure, the number and size of the lobes on the lobe joint members can be determined by the design requirements of any given project. In accordance with some embodiments, a minimum of three (3) lobes may be required for efficient torque transfer. However, the number of lobes may be varied and a polygon shape (e.g., multi-lobe, and in some embodiments greater than three) may be recommended.

Figure 5:
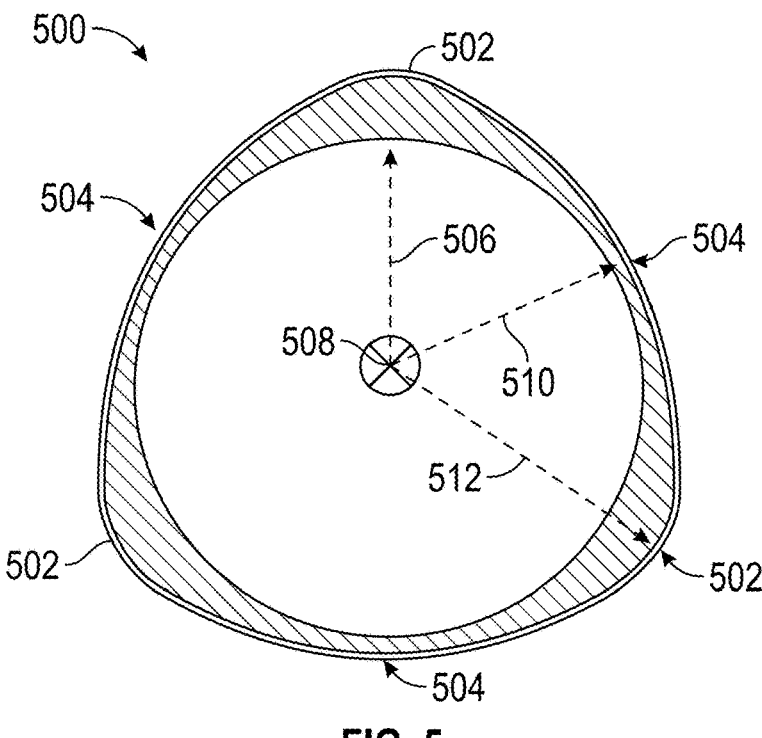
FIG. 5 is a cross-sectional illustration of a lobe joint member in accordance with an embodiment of the present disclosure.

Referring now to FIG. 5, a schematic illustration of a lobe joint member 500 in accordance with an embodiment of the present disclosure is shown. The lobe joint member 500 may be similar to the lobe joint members described above and may be configured to be integrated into a composite drive shaft, and may include an inwardly extending mounting flange, which is not shown for clarity of illustration. As shown, the lobe joint member 500 includes three lobes 502 that are equally spaced about the circumference of the lobe joint member 500. Each lobe 502 is formed or defined by an increase in material thickness as compared to non-lobe portions, such as flanks 504. The flanks 504 may have or include a minimum material thickness of the lobe joint member 500 and the peaks of the lobes 502 may define a maximum material thickness of the lobe joint member 500. As shown, the interior of the lobe joint member 500 is a hollow tube having an internal radius 506 and an axis 508 passing therethrough. The minimum material thickness that is present at the flanks 504 is defined between the internal radius 506 and an external flank radius 510. Similarly, the maximum material thickness that is present at the lobes 502 is defined between the internal radius 506 and an external lobe radius 512. The lobed shape is provided by the change in material thickness (in a circumferential or tangential direction) between the lobes 502 (maximum material thickness) and the flanks 504 (minimum material thickness), with a constant or uniform internal radius 506 defined within the lobe joint member 500.

Figure 6:
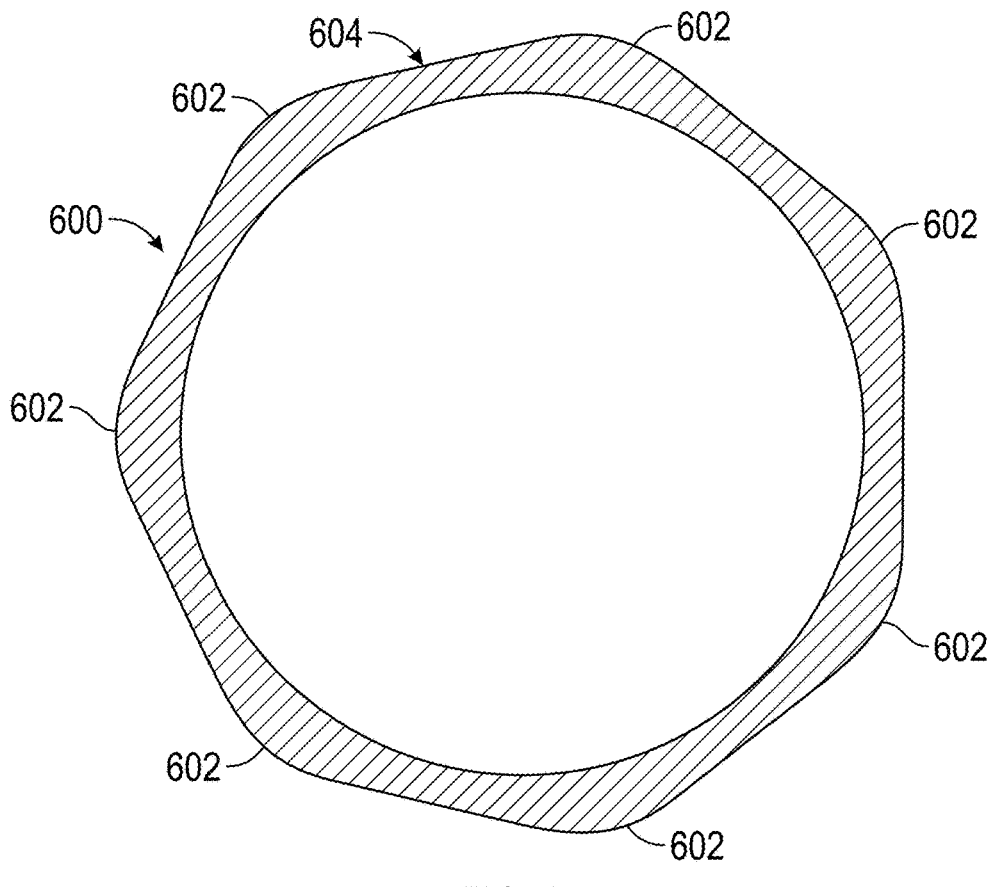
FIG. 6 is a cross-sectional illustration of a lobe joint member in accordance with an embodiment of the present disclosure.

FIG. 6 illustrates an alternative non-limiting configuration of a lobe joint member 600 in accordance with an embodiment of the present disclosure. The lobe joint member 600 may be similar to that shown and described above but includes seven (7) total lobes 602 with flanks 604 extending between the lobes 602. The lobe joint member 600 includes and defines a circular and uniform radius interior. As illustrated, the lobes 602 provide for maximum material thickness at the peaks of the respective lobes 602, and a minimum material thickness of the lobe joint member 600 (in the region of the lobes 602) is provided by the flanks 604 that are defined between adjacent lobes 602 about the circumference of the lobe joint member 600. As illustrated, the seven (7) lobes 602 are equally spaced about the lobe joint member 600, and the length of the flanks between adjacent lobes 602 is the same.

In each of the embodiments of FIGS. 5-6, the number of lobes is odd numbered. However, it will be appreciated that any number of lobes, whether even or odd numbered, may be employed without departing from the scope of the present disclosure. Further, the number and sizes (e.g., material thickness) of lobes (and flanks) can be determined by the design requirements of any given project. In accordance with some example specific configurations, a minimum of three (3) lobes are used for efficient torque transfer.

Referring now to FIG. 7, a flow process 700 for manufacturing a composite drive shaft having integral lobe joint members arranged at ends thereof is illustratively shown. The flow process 700 is a method of manufacturing composite drive shafts such as those shown and described above.

At block 702, a removable mandrel and integral lobe joint members are assembled. As noted above, an interference fit or the like may be used to secure the lobe joint members to ends of the removable mandrel. The lobe joint members will have two or more lobes, arranged in a generally symmetric or repeating pattern of lobes and flanks. Extending axially from the lobes, in both directions, are tapering portions that reduce the material thickness of the lobe joint members in a gradual manner to respective sleeves at opposite axial ends of the lobe joint members. The outer diameter surface of the sleeves and the outer diameter of the removable mandrel are equal such that a smooth transition along the exterior of the removable mandrel and the lobe joint members is provided. In some configurations, the removable mandrel and/or the lobe joint member may include a pilot feature for ensure proper engagement and alignment of the two components.

The removable mandrel may be made from, for example and without limitation, metallic materials (e.g., titanium, steel, aluminum, alloys, etc.), dissolvable polymers, wash out sand/ceramics, or polymer formable bladders. The lobe joint members may be made from metallic materials (e.g., titanium, steel, aluminum, alloys, etc.) and/or composite materials (e.g., thermosets, thermoplastics, etc.) using various methods to form the complex geometries described herein. In the case of metallic lobe joint members, such components may be made from various metals and may be machined, ground, electrical discharge machined (EDM), or the like, to form the lobes, flanks, sleeves, and tapering portions. In other embodiments, the lobe joint members may be manufactured using additive manufacturing such that the lobes/flanks are not formed by removal of material but are directly formed with the desired material thickness.

At block 704, removable end flanges are attached or assembled to the integral lobe joint members opposite from the removable mandrel. The removable end flanges may be fixedly attached to the lobe joint members at a mounting flange of the lobe joint members. The mounting flanges may extend radially inward from an outer diameter of the lobe joint members. The attachment may be fasteners or the like, to secure the removable end flanges to the lobe joint members. In some embodiments a single lobe joint member may be attached at one end of a removable mandrel and a removable end flange may be attached opposite the removable mandrel. In other embodiments, two lobe joint members may be provided with a removable mandrel arranged between the two lobe joint members and each lobe joint member may have a respective removable end flange attached thereto. The end result is a manufacturing assembly, such as shown and described above.

At block 706, composite material is applied to the manufacturing assembly. The composite material may be applied as tapes, fibers, strips of material, or the like. The composite material may be a carbon fiber tape, carbon fibers, glass fibers, organic fibers, and various matrix materials such as PEEK, PEAK, PEKK, and thermoset matrix materials. In accordance with some embodiments, the fiber configurations may be continuous fiber tape or the like. However, in other embodiments, chopped fiber, short fiber, or the like may be used within a fiber tape. For example, and without limitation, the composite material may be applied using an Automated Fiber Placement (AFP) method and/or an Automated Tape Laying (ATL) method. The wrapping process of the tapes and/or fibers may be started at one end of the manufacturing assembly, such as at one of the removable end flanges, and then the tapes/fibers are wrapped about the removable end flanges, over the lobe joint members (and the lobes thereof), and extended along the removable mandrel, and then about the lobe joint member at the opposite end, and finally about the removable end flange at the other end of the manufacturing assembly.

In some configurations, the manufacturing process does not include any post-processing (e.g., autoclave, thermal treatment, etc.). Such additional processing may be used for embodiments that incorporate thermoset resins or the like. However, in most embodiment and configurations, advantageously, such additional processing may be eliminated by using thermoplastic materials using the AFP/ATL processes to create a structure with no post-processing such as a curing step. That is, the thermoplastic material may be cured and consolidated during the AFP/ATL processing (e.g., in-situ cure/consolidation).

At blocks 708-712, with the consolidated and assembled composite drive shaft formed, the removal of the removable or reusable components is performed. For example, at block 708, the removable end flanges are removed. Such removal may include unfastening fasteners that fixedly attached the removable end flanges to the lobe joint members at the mounting flanges thereof. At block 710, the interior removable mandrel may be removed as described above (e.g., melting, dissolving, disassembling, wash out, etc.). Finally, at block 712, excess composite material that was wrapped/wound about the removable end flanges during block 706 may be trimmed such that the composite material terminates or ends at the same axial position as the end of the lobe joint members (and/or the mounting flange thereof). The trimming may be done by cutting, grinding, or the like. It will be appreciated that the removal steps performed at blocks 708-712 may be performed in other orders of operation, and thus illustrative flow process 700 is merely for illustrative and explanatory purposes. For example, the trimming (block 712) occur before the interior removable mandrel is removed (block 710). In still other embodiments, the trimming (block 712) and the removal of the removably end flanges (block 708) may be performed substantially simultaneously.

At block 714, with the removal of the removable parts, the composite drive shaft is formed. The composite drive shaft includes a tubular body formed of composite material, with one or two lobe joint members integrally assembled with the tubular body. The lobe structure of the lobe joint member ensures that the lobe joint members are fixedly attached to the composite material, with the tapering portions thereof ensuring a tight connection and integration. Advantageously, no fasteners or the like are used to secure the lobe joint members to the composite tubular. Rather, the composite tubular integrates the lobe joint members directly therein.

Advantageously, embodiments of the present disclosure are directed to improved drive shafts made from composite materials and methods of making such composite drive shafts. The composite drive shafts, as described herein, incorporate one or more end components referred to as lobe joint members. The lobe joint members are integrally manufactured with the composite drive shaft such that the formed composite drive shaft includes a tubular body with integrally formed end joint/flange structures. There is no need for fasteners to add weight and/or require associated drilling or the like. As such, advantageously, embodiments of the present disclosure provide for improved manufacturing processes along with reduced weight and complexity of both the manufacturing process and the final drive shaft.

Some embodiments of the present disclosure are directed to alternative methods to transmit torque from a metallic flange (e.g., the described lobe joint members) to a composite tube. Radial fasteners are eliminated from the manufacturing process and the final formed composite drive shaft, thus reducing weight of the drive shaft, reducing the number of potential failure points, and may reduce manufacturing costs associated with such fasteners. Further, the use of composite materials can reduce the weight of the drive shafts while the lobe joint members ensure that the appropriate amount of input load capacity is maintained (e.g., torque transfer, bend moment, axial force, etc.).

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The terms "about" and "substantially" are intended to include the degree of error associated with measurement of the particular quantity based upon the equipment available at the time of filing the application. For example, "about" and/or "substantially" can include, for example, a range of ±8% of a given value.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiments disclosed as the best mode contemplated for carrying out this present disclosure, but that the present disclosure will include all embodiments falling within the scope of the claims.

What is claimed is:

1. A method of making a composite drive shaft, the method comprising:
   providing a removable mandrel having a cylindrical shape;
   assembling a lobe joint member at an end of the removable mandrel, the lobe joint member comprising at least three lobes equally distributed about the lobe joint member;
   assembling a removable end flange to the lobe joint member at an opposite end of the lobe joint member from the removable mandrel to form a manufacturing assembly;
   applying a composite material to an exterior surface of the manufacturing assembly to form a composite tubular that includes the lobe joint member at an end thereof;
   removing the removable end flange from the lobe joint member; and
   removing the removable mandrel from within the composite tubular to form a composite drive shaft comprising the composite tubular and the lobe joint member integrally formed at an end of the composite tubular.

2. The method of claim 1, wherein the lobe joint member is a first lobe joint member arranged at a first end of the removable mandrel and the removable end flange is a first removable end flange, the method further comprising:
   assembling a second lobe joint member at an end of the removable mandrel opposite the first lobe joint member; and
   assembling a second removable end flange to the second lobe joint member at an opposite end of the second lobe joint member from the removable mandrel.

3. The method of claim 1, wherein the composite material comprises composite fibers and applying the composite fibers comprises automated fiber placement.

4. The method of claim 1, wherein the composite material comprises composite tape and applying the composite tape comprises automated tape laying.

5. The method of claim 1, wherein the removable mandrel comprises a metal material.

6. The method of claim 1, wherein the lobe joint member comprises an inwardly extending mounting flange.

7. The method of claim 6, wherein the removable end flange is attached to the lobe joint member by one or more fasteners to the mounting flange.

8. The method of claim 1, wherein the removable end flange is attached to the lobe joint member by one or more fasteners.

9. The method of claim 1, wherein the lobe joint member has an axis passing therethrough, the lobe joint member comprising a first sleeve at a first end of the lobe joint member in the axial direction, a first tapering portion of increasing material thickness extending from the first sleeve to the at least three lobes, a second tapering portion of decreasing material thickness extending from the at least three lobes toward a second sleeve at a second end of the lobe joint member, opposite the first sleeve.

10. The method of claim 1, further comprising trimming excess material of the composite material that was applied to the removable end flange during the application of the composite material to the manufacturing assembly.

11. The method of claim 1, wherein applying the composite material comprises applying at least one of composite fibers and composite tapes about the manufacturing assembly.

12. The method of claim 11, wherein multiple layers of the at least one of composite fibers and composite tapes are applied to the manufacturing assembly.

13. The method of claim 12, wherein each layer of the multiple layers is arranged at a different angle relative to an axis through the manufacturing assembly.

14. The method of claim 1, wherein assembling the lobe joint member at the end of the removable mandrel comprises securing the lobe joint member to the removable mandrel at a pilot feature of the removable mandrel.

15. The method of claim 1, wherein the composite material is applied to extend over at least an exterior surface of the removable mandrel and an exterior surface of the lobe joint member.

16. The method of claim 15, wherein the composite material is applied to extend over an exterior surface of the removable end flange.

17. The method of claim 1, wherein the removable mandrel is removed by at least one of melting, dissolving, and washing of the material of the removable mandrel from within the composite tubular.

18. The method of claim 1, wherein the removable mandrel is a multipiece removable mandrel and the removable mandrel is removed from with the composite tubular by disassembly of the removable mandrel.

\* \* \* \* \*